United States Patent
Iwamoto

[19]

[11] Patent Number: 5,901,016
[45] Date of Patent: May 4, 1999

[54] DISK DRIVE SUSPENSION WITH HYBRID LEADS

[75] Inventor: Alejandro Koji Iwamoto, Temecula, Calif.

[73] Assignee: Magnecomp Corp., Temecula, Calif.

[21] Appl. No.: 08/897,660

[22] Filed: Jul. 21, 1997

[51] Int. Cl.⁶ .................................................. G11B 5/48
[52] U.S. Cl. ......................................................... 360/104
[58] Field of Search ................................. 360/104–106, 360/108

[56] References Cited

U.S. PATENT DOCUMENTS

| | | | |
|---|---|---|---|
| 4,811,143 | 3/1989 | Ohashi et al. | 360/105 |
| 4,819,108 | 4/1989 | Seki et al. | 360/104 |
| 5,103,359 | 4/1992 | Marazzo | 360/104 |
| 5,392,179 | 2/1995 | Sendoda | 360/104 |
| 5,404,636 | 4/1995 | Stefansky et al. | 360/104 |
| 5,597,496 | 1/1997 | Masaichi et al. | 360/104 |
| 5,604,649 | 2/1997 | Hernandez | 360/104 |
| 5,631,788 | 5/1997 | Richards | 360/104 |
| 5,657,186 | 8/1997 | Kudo et al. | 360/104 |
| 5,663,854 | 9/1997 | Grill et al. | 360/104 |

FOREIGN PATENT DOCUMENTS

| | | |
|---|---|---|
| 1-78313 | 5/1989 | Japan . |
| 3-290801 | 12/1991 | Japan . |

*Primary Examiner*—Jefferson Evans
*Attorney, Agent, or Firm*—Louis J. Bachand

[57] ABSTRACT

The efficiency of wire bundle conductors is realized in a disk drive suspension without wire bundle biasing of the slider movement by interposing a section of flexible conductive laminate conductor between the wire bundle terminus and the slider, thereby obtaining the nearly bias free connection of the flexible conductive laminate conductor to the slider and as well substantially the superior electrical performance of the wire bundle conductor.

17 Claims, 1 Drawing Sheet

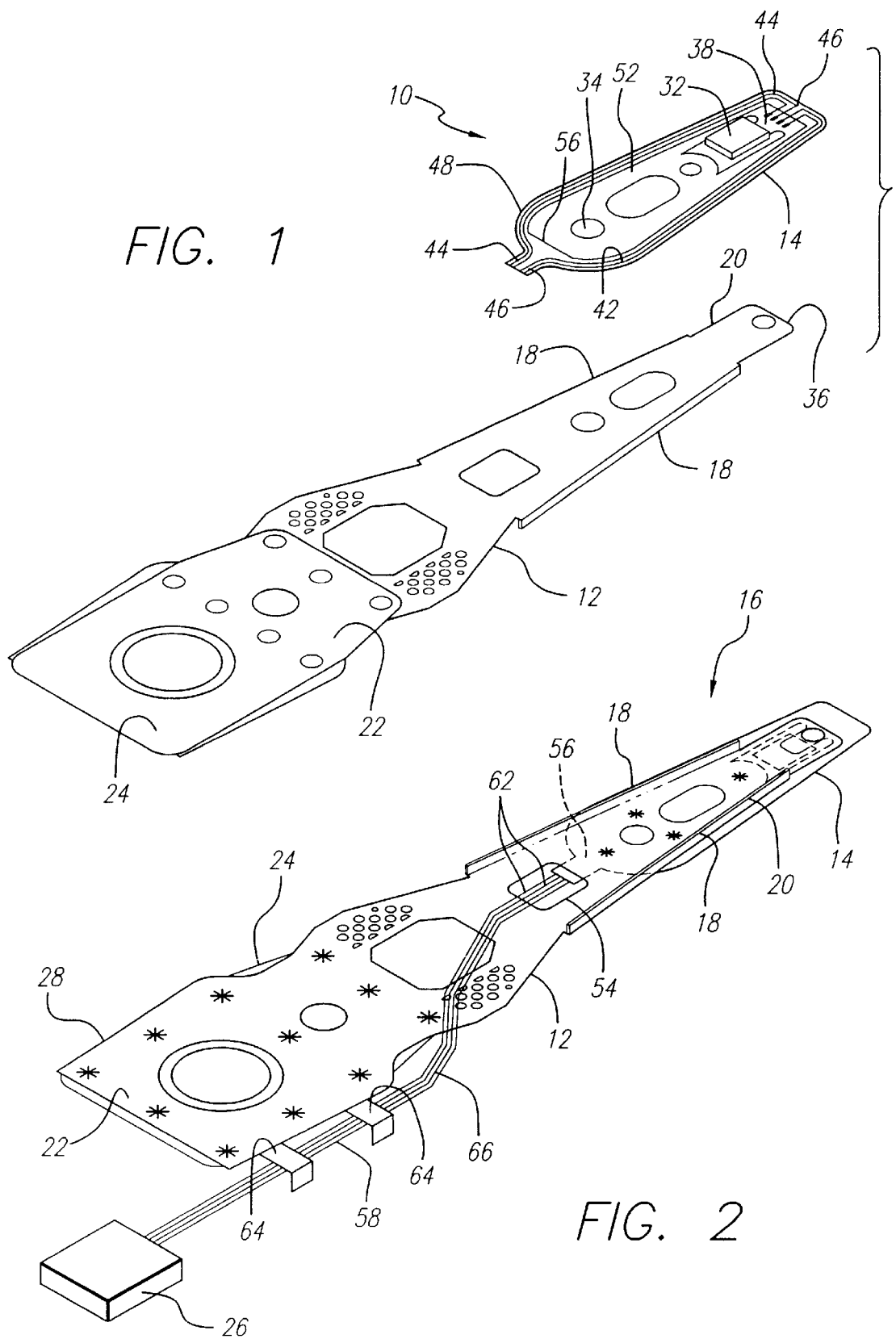

DISK DRIVE SUSPENSION WITH HYBRID LEADS

BACKGROUND OF THE INVENTION

This invention has to do with disk drive suspensions, and more particularly with improvements in the design and structure of disk drive suspension electrical connectors that are used to carry current between a load beam-supported slider and suspension-associated signal circuitry. In a specific aspect, the invention provides a disk drive suspension in which the advantages of wire bundle conductors, including lower cost and better electrical properties, especially at higher frequencies, are maximally obtained while freeing the suspension flexure from biasing forces normally incident in a wire bundle connector, by using flexible circuit conductor for that portion of the connector likely to bias movement of the flexure.

BRIEF SUMMARY OF THE INVENTION

It is accordingly an object of the invention to provide a novel disk drive suspension having electrical connections which provide substantially the benefits of the wire bundle conductors and which avoid the problems of excessive torque exertion on the slider by the wire bundle. It is another object to provide an improved suspension in which the manufacturing advantages of flexible circuit, including ready automation of slider-to-flexure assembly and substantially bias-free attachment to the slider, are also realized along with the just-mentioned benefits of a wire bundle conductor. It is a further object to provide a suspension having a novel hybrid connector of wire bundle conductor and flexible circuit conductor, maximizing the advantages of each and minimizing the disadvantages of each in the resultant disk drive suspension.

These and other objects of the invention to become apparent hereinafter are realized in a disk drive suspension comprising a load beam, and supported by the load beam a flexure carrying a slider head, an electrical connector running substantially the length of the load beam to the slider, the connector comprising an electrically integrated hybrid of different segments including a wire bundle segment and a flexible conductive laminate segment, the segments being arranged sequentially and in such manner that the slider head is electrically coupled by the wire bundle segment at the proximal end of the load beam, and by the flexible conductor at the distal end of the load beam, whereby the flexure is free of wire bundle bias in its movement.

In this and like embodiments, preferably, the electrical connector is carried by the load beam alongside the load beam for a major portion of its length, the electrical connector wire bundle segment comprises at least one twisted pair of conductive wires, the electrical conductor flexible conductive laminate segment comprises at least one pair of conductive leads laminated with plastic film, the wire bundle segment extends from the proximate end of the load beam and terminates short of the flexure, the flexible conductive laminate defining an electrically conductive extension of the wire bundle from its locus of termination to the slider, the flexible conductive laminate segment is electrically connected to the slider substantially in slider movement bias free relation, and/or the wire bundle segment constitutes about two-thirds of the length of the electrical connector, and the flexible conductive laminate about one-third of the length of the electrical connector.

In a further embodiment, the invention provides a disk drive suspension comprising a load beam, and supported by the load beam a flexure carrying a slider head, an electrical connector carried by the load beam along a major portion of the connector length, the connector comprising a two-component structure of separate, physically different conductors, the conductors being joined to define a continuous electrical path for carrying current from the slider head to signal circuitry beyond the load beam while keeping the slider head movement free of wire bundle induced bias.

In this and like embodiments, preferably, the separate, physically different conductors include a wire bundle conductor and a flexible conductive laminate conductor, the conductors are joined at a locus adjacent the proximate end edge of the flexure, the wire bundle conductor comprises at least one twisted pair of conductive wires, the flexible conductive laminate conductor comprises at least one pair of conductive leads laminated with plastic film, the wire bundle conductor extends from the proximate end of the load beam to the locus, the flexible conductive laminate conductor extends from the locus to the slider, the flexible conductive laminate conductor is electrically connected to the slider substantially in slider movement bias free relation, the wire bundle conductor constitutes about two-thirds of the length of the electrical connector, and the flexible conductive laminate conductor about one-third of the length of the electrical connector; and the load beam is apertured at the locus, the slider is located on a first surface of the load beam, and the wire bundle conductor is located on the opposite surface of the load beam, the flexible conductive laminate conductor being connected to the wire bundle through the load beam aperture.

A further aspect of the invention comprises in combination on a load beam: a wire bundle conductor and a flexible conductive laminate conductor, electrically coupled into a single electrical connector and arranged to conduct current from a slider to signal circuitry.

In its method aspects the invention contemplates the method of conducting current from a load beam and flexure-carried slider to suspension associated signal circuitry, including conducting the current through a wire bundle conductor, and interposing a sufficient extent of flexible conductive laminate conductor between the wire bundle and the slider to block the wire bundle conductor biasing movement of the slider.

BRIEF DESCRIPTION OF THE DRAWINGS

The invention will be further described in conjunction with the attached drawings in which:

FIG. 1 is an axonometric view of the invention disk drive suspension load beam, rails down, and flexure assembly juxtaposed with the flexible conductive laminate conductor shown separated for clarity of illustration;

FIG. 2 is a view of the disk drive suspension load beam, rails up, assembled with a hybrid electrical connector of a wire bundle conductor and flexible conductive laminate conductor.

DETAILED DESCRIPTION OF THE INVENTION

The present invention suspension utilizes a novel electrical connector in which flexible conductive laminate conductor provides the slider-head interconnect and the major portion of the connector is wire bundle. The advantages of the invention includes an absence of wire bundle bias at the slider/air bearing, reduced cost in comparison with other alternatives to wire connectors, possible use of gold bond and other efficient bonding methods at the slider connection, possible wire bonding of the wire bundle to the flexible conductive laminate conductor at the load beam, and versatility in wire gage selection, e.g., 46–50 gage.

The lower cost of wire bundle conductors and their better electrical performance, particularly at the higher frequencies now wanted in the industry argue for use of wire bundles as the electrical connection in a load beam suspension. Flexible conductive laminate conductors are favored where reduction in the torque normally exerted on the slider by wires is problematic, as where the sliders are quite small, or where the possibility of automated slider-to-flexure assembly, in which the slider bonding pads are matched to the corresponding flexure bond pads at a fixed location relative to the tooling features of the suspension, justifies the use of these conductors despite their fragility and costliness.

The invention hybrid electrical connector uses a flexible circuit type flexure with circuit traces contained on it and connected to wire bundle wires immediately at the proximate end of the flexure. This assembly offers the advantages that the flexible circuit can be smaller than it would if it extended all the way to the actuator connection points, a important consideration given the high material cost of the flexible circuit conductor. Further the flexible circuit and flexure when formed as a strip can be handled with known manufacturing procedures, including placement and welding, and automation is feasible. The product offers substantially the electrical performance of a wire bundle system. Moreover, manufacturing costs are reduced over a purely flexible circuit connector as adhesive bonding, cleaning steps, handling difficulties and outgassing are all reduced or eliminated with the new hybrid connector.

With reference now to the drawings in detail, in FIGS. 1 and 2 the invention disk drive suspension 10 comprises a load beam 12 and a flexure 14 shown as a unit 16 in FIG. 2. Load beam 12 is generally planar and locally flanged to have side rails 18 in its distal portion 20. Load beam base portion 22 attaches to a mounting plate 24 which in turn mounts the load beam 12 to an actuator (not shown). Signal circuitry element 26 is located at the proximate end 28 of the load beam 12 for the purpose of sensing and transmitting signal exchanges through electrical connector 66 with the slider 32 carried on flexure 34 attached to the load beam distal end 36. Slider 32 defines an air bearing relative to the disk drive disk and carries the electrical and magnetic portions of the head.

The load beam 12, flexure 14, slider 32 and signal circuitry element 26 shown are typical of suitable structures for their respective functions, with no particular form or design of load beam, flexure, slider or signal circuitry being critical to this invention.

The invention is concerned particularly with improvements in the design and form of the electrical connector 66 between the signal circuitry 26 and the slider 32. With reference to FIG. 1, the flexure 14 is generally rectangular in shape and defines a central tongue 38 to which the slider 32 is mounted for gimballing response. The freedom of movement of the flexure 14, shown separated for clarity of illustration only, and rotation of the slider 32 in various axes is critical to the optimum functioning of the suspension 10. It is nonetheless required to attach electrical connectors to the flexure and fine leads to the slider, without unduly affecting the movement freedom of these elements. In the present device, flexible conductive laminate 42 comprising pairs of conductive leads 44, 46 laminated to plastic film 48 is secured to the flexure and its leads used to electrically couple to the slider 32. The flexible conductive laminate 42 typically comprises a self-supporting film with embedded conductors, or a layer of conductors, formed in place and suitably insulated from the underlying metallic structures. As will be noted from the drawings, the conductive laminate 42 lies lightly and flexibly upon and uniform about the peripheral margin 52 of the flexure 14, adding no particular bias to the movement of the flexure, even when tacked in place, unlike wire connections which with their greater stiffness alter the normal responsive movement of the flexure to forces acting upon it in the operation of the disk drive, and limit the accuracy of that responsive movement. The use of flexible conductive laminate 42 on the flexure 14 enables automated attachment of the leads 44, 46 to the slider 32 as noted previously and is advantageous in the manufacturing process over wire connection.

In FIG. 2, the load beam 12 is shown assembled with the flexure 14 and the unit 16 inverted to have the side rails 18 extend upward. The load beam 12 is apertured at 54 just beyond the proximal edge 56 of the flexure 14. The leads 44, 46 from the flexible conductive laminate 42 are gathered at the flexure edge 56 and there are accessible through aperture 54 of the load beam 12. Wire bundle 58 comprising typically multiple wire pairs 62 is trained along the load beam 12 length as at the outrigger supports 64, and lead to and through the aperture 54 for connection to the conductive leads 44, 46 of the flexible conductive laminate 42 to form electrical connector 66 running the length of the load beam and electrically interconnecting slider 32 and signal circuitry element 26. Wire bond attachment of the wire bundle 58 wires and laminate 42 leads is preferred for reasons of efficiency and effectiveness but any form of conductive coupling can be used.

The electrical connector 66 is thus a hybrid of the wire bundle 58 and the flexible conductive laminate 42. This hybrid affords the conductivity and ruggedness benefits of the wire bundle conductor for the greater portion of the connector length, typically about two-thirds of the conductor is wire bundle, thus capturing substantially the benefits of a wire bundle for this suspension. The bias problems of the wire bundle type connection are avoided, however, by the substitution of the flexible conductive laminate at those portions of the connector where wire bias may be a problem, thus providing the benefits and not the drawbacks of each type of conductor.

Typical materials and stiffness properties of the suspension 10 include:

Suspension load beam: Stainless steel, 304—0.0025"/ 63.5 $\mu$m thick

Flexure material: Stainless steel, 304—0.0008"/20 $\mu$m thick

Dielectric: Polymide, 0.0007"/18 $\mu$m thick

Conductor: Copper, 0.0007"/18 $\mu$m thick

Pitch: 1.67 $\mu$N-m/deg

Roll: 1.61 $\mu$N-m/deg

Lateral: 17.1 N/mm

The foregoing objects of the invention are thus met.

I claim:

1. A disk drive suspension comprising a load beam having first and second surfaces and an aperture communicating between said surfaces, and supported by said load beam at its said first surface a flexure carrying a slider head, an electrical connector running substantially the length of said load beam to said slider, said connector extending through said load beam aperture and comprising an electrically integrated hybrid of different segments including a wire bundle segment located at said second surface and a flexible conductive laminate segment located at said first surface, said segments being arranged sequentially and in such manner that the slider head is electrically coupled only by said wire bundle segment at the proximal end of said load beam, and only by said flexible conductive laminate segment at the distal end of said load beam, whereby said flexure is free of wire bundle bias in its movement.

2. The disk drive suspension according to claim 1, in which said electrical connector is carried by said load beam alongside said load beam for a major portion of its length.

3. The disk drive suspension according to claim 1, in which said electrical connector wire bundle segment comprises at least one twisted pair of conductive wires.

4. The disk drive suspension according to claim 1, in which said electrical conductor flexible conductive laminate segment comprises at least one pair of conductive leads laminated with plastic film.

5. The disk drive suspension according to claim 1, in which said wire bundle segment extends from the proximate end of said load beam and terminates short of said flexure, said flexible conductive laminate defining an electrically conductive extension of said wire bundle from its locus of termination to said slider.

6. The disk drive suspension according to claim 1, in which said flexible conductive laminate segment is electrically connected to said slider substantially in slider movement bias free relation.

7. The disk drive suspension according to claim 1, in which said wire bundle segment constitutes about two-thirds of the length of said electrical connector, and said flexible conductive laminate about one-third of the length of said electrical connector.

8. A disk drive suspension comprising a load beam, and supported by said load beam a flexure carrying a slider head, an electrical connector carried by said load beam along a major portion of the connector length, said connector comprising a two-component structure of separate, physically different conductors, said conductors being joined to define an continuous electrical path for carrying current from said slider head to signal circuitry beyond said load beam while keeping said slider head movement free of wire bundle induced bias.

9. The disk drive suspension according to claim 8, in which said conductors are joined adjacent the proximate end edge of said flexure.

10. The disk drive suspension according to claim 9, in which said wire bundle conductor comprises at least one twisted pair of conductive wires.

11. The disk drive suspension according to claim 9, in which said flexible conductive laminate conductor comprises at least one pair of conductive leads laminated with plastic film.

12. The disk drive suspension according to claim 11, in which said wire bundle conductor extends from the proximate end of said load beam to said locus.

13. The disk drive suspension according to claim 12, in which said flexible conductive laminate conductor extends from said locus to said slider.

14. The disk drive suspension according to claim 13, in which said flexible conductive laminate conductor is electrically connected to said slider substantially in slider movement bias free relation.

15. The disk drive suspension according to claim 14, in which said wire bundle conductor constitutes about two-thirds of the length of said electrical connector, and said flexible conductive laminate conductor about one-third of the length of said electrical connector.

16. In combination on a load beam having a proximal and a distal end and an aperture therebetween, said load beam being adapted to carry a flexure and a slider at said distal end: a wire bundle conductor and a flexible conductive laminate conductor, electrically coupled sequentially into a single electrical connector extending through said aperture and arranged to conduct current from a slider to signal circuitry said wire bundle conductor being at said load beam proximal end, said flexible conductive laminate being at said load beam distal end, whereby said flexure is free of wire bundle bias in its movement.

17. The method of conducting current from a slider carried by a load beam to signal circuitry including conducting said current through a wire bundle conductor located at a surface of said load beam remote to said slider, and interposing a sufficient extent of flexible conductive laminate conductor located at a surface of said load beam adjacent said slider between said wire bundle and said slider to block said wire bundle conductor biasing movements of said slider.

* * * * *

UNITED STATES PATENT AND TRADEMARK OFFICE
CERTIFICATE OF CORRECTION

PATENT NO. : 5,901,016
DATED : May 4, 1999
INVENTOR(S) : Iwamoto

It is certified that error appears in the above-identified patent and that said Letters Patent is hereby corrected as shown below:

Column 5, lines 34-43 should read:

--8. A disk drive suspension comprising a load beam, and supported by said load beam a flexure carrying a slider head, an electrical connector carried by said load beam along a major portion of the connector length, said connector comprising a two-component structure of separate, physically different conductors, including a wire bundle conductor and a flexible conductive laminate, said load beam being apertured at a locus, said slider being located on a first surface of said load beam, and said wire bundle conductor being located on the opposite surface of said load beam, said flexible conductive laminate conductor being connected to said wire bundle through said load beam aperture, said conductors being joined to define a continuous path for carrying current from said slider head to signal circuitry beyond said load beam while keeping said slider head movement free of wire bundle induced bias.--.

Signed and Sealed this

Seventh Day of December, 1999

*Attest:*

Q. TODD DICKINSON

*Attesting Officer*  Acting Commissioner of Patents and Trademarks